(12) United States Patent
Horimai

(10) Patent No.: US 6,807,671 B2
(45) Date of Patent: Oct. 19, 2004

(54) OPTICAL PIC-KUP

(75) Inventor: Hideyoshi Horimai, Kanagawa (JP)

(73) Assignee: Optware Corporation, Yokohama (JP)

( * ) Notice: Subject to any disclaimer, the term of this patent is extended or adjusted under 35 U.S.C. 154(b) by 134 days.

(21) Appl. No.: 10/221,320

(22) PCT Filed: Mar. 9, 2001

(86) PCT No.: PCT/JP01/01845
§ 371 (c)(1),
(2), (4) Date: Sep. 11, 2002

(87) PCT Pub. No.: WO01/73773
PCT Pub. Date: Oct. 4, 2001

(65) Prior Publication Data
US 2003/0031112 A1 Feb. 13, 2003

(30) Foreign Application Priority Data
Mar. 29, 2000 (JP) .......................................... 2000-90813

(51) Int. Cl.[7] .......................... G11B 7/085; G11B 17/00
(52) U.S. Cl. ................................... 720/674; 369/244.1
(58) Field of Search .......................... 369/244.1, 247.1, 369/103, 44.14, 44.28, 44.25, 44.32, 44.41; 359/13.11, 30; 720/674

(56) References Cited

U.S. PATENT DOCUMENTS

| | | | | |
|---|---|---|---|---|
| 4,876,680 A | * | 10/1989 | Misawa et al. | 369/112.14 |
| 5,504,724 A | * | 4/1996 | Yang | 369/44.24 |
| 5,828,637 A | * | 10/1998 | Kim | 369/44.28 |
| 5,970,027 A | * | 10/1999 | Narita et al. | 369/13.35 |

* cited by examiner

Primary Examiner—Allen Cao
(74) Attorney, Agent, or Firm—Oliff & Berridge, PLC

(57) ABSTRACT

An optical pick-up device that records and/or reproduces information on an optical information recording medium, through the use of holography, can prevent deterioration of recording and reproduction accuracy due to vibrations from exterior or fluctuations in the relative positional relationship with the recording medium. The optical pick-up device includes a pick-up body and a position adjusting device. The position adjusting device changes the position of the pick-up body in a direction perpendicular to a surface of the recording medium, in a direction parallel to the surface of the recording medium, and in such a direction as to change the inclination of the pick-up body with respect to the surface of the recording medium.

9 Claims, 9 Drawing Sheets

1

0

OPTICAL PIC-KUP

TECHNICAL FIELD

The present invention relates to an optical pick-up device which at least either records information on an optical information recording medium on which information is recorded through the use of holography, or reproduces information from the optical information recording medium.

BACKGROUND ART

Holographic recording for recording information on a recording medium through the use of holography is typically performed by superimposing light that carries image information on reference light within the recording medium and by writing the resulting interference pattern onto the recording medium. For reproducing the information recorded, the recording medium is irradiated with reference light so that the image information is reproduced through diffraction derived from the interference pattern.

Recently, volume holography, or digital volume holography in particular, has been developed and is attracting attention in practical fields for ultra-high density optical recording. Volume holography is a method for writing a three-dimensional interference pattern by making positive use of a recording medium in the direction of thickness as well, and is characterized in that it is possible to enhance the diffraction efficiency by increasing the thickness and to achieve a greater recording capacity by employing multiplex recording. Digital volume holography is a computer-oriented holographic recording method which uses the same recording medium and recording method as with the volume holography, whereas the image information to be recorded is limited to binary digital patterns. In the digital volume holography, analog image information such as a picture is once digitized and developed into two-dimensional digital pattern information, and then it is recorded as image information. For reproduction, this digital pattern information is read and decoded to restore the original image information for display. Consequently, even if the SN ratio (signal-to-noise ratio) in the reproduction is somewhat poor, it is possible to reproduce the original information with extremely high fidelity by performing differential detection and/or error correction on encoded binary data.

In conventional holographic recording, a recording medium itself contains no information intended for positioning. Therefore, positioning of information light and reference light with respect to the recording medium is possible only mechanically, which makes a precise positioning difficult. On that account, the conventional holographic recording has such disadvantages that random access to the recording medium is difficult and high density recording is also difficult.

Under the circumstances, it is conceivable that the recording medium intended for holographic recording may be formed into a plate-like ordinary optical disks such as a CD (compact disk), and a recording/reproducing apparatus intended for holographic recording may be configured so that an optical pick-up device including an optical system for recording information on and reproducing information from the recording medium is rendered movable with respect to the recording medium.

In ordinary optical disk devices, focus servo and tracking servo are performed typically by driving an objective lens in the optical pick-up device. Under such configuration, vibrations externally applied to the optical pick-up device cause relative vibrations between the objective lens and the other parts in the optical system. Those vibrations, even if they are of a magnitude as low as to be insignificant to ordinary optical disk devices, affect the recording and reproduction operations greatly in the case of holographic recording. More specifically, in the case of holographic recording, even the slightest vibrations of the optical system under recording can cause a large change in the interference pattern to thereby preclude accurate recording of information. Under reproduction, a shift in positional relationship between the reference light for reproduction and the interference pattern may hamper accurate reproduction of information.

Similarly, in holographic recording, a relative inclination between the recording medium and the optical pick-up device has a greater impact than in ordinary optical disk devices.

Thus, in holographic recording, the use of an optical pick-up device having the same structure as that of an ordinary optical disk device results in the problem that vibrations externally applied to the optical pick-up device and fluctuations in the relative positional relationship between the optical pick-up device and the recording medium deteriorate recording and reproduction accuracies to a greater extent than in the case of ordinary optical disk devices.

DISCLOSURE OF THE INVENTION

An object of the invention is to provide an optical pick-up device for at least either recording information on an optical information recording medium on which information is recorded through the use of holography, or reproducing information from the optical information recording medium, which make it possible to prevent deterioration of recording and reproduction accuracy resulting from external vibrations or fluctuations in the relative positional relationship with the recording medium.

An optical pick-up device of the invention comprises:

a pick-up body for at least either recording information on an optical information recording medium on which information is recorded through the use of holography, or reproducing information from the optical information recording medium; and position adjusting means for adjusting a position of the pick-up body in order to correct a shift in a relative positional relationship between the pick-up body and the optical information recording medium.

In the optical pick-up device of the invention, the position adjusting means adjusts the position of the pick-up body, whereby a shift in the relative positional relationship between the pick-up body and the optical information recording medium is corrected.

In the optical pick-up device of the invention, the position adjusting means may change the position of the pick-up body in a direction perpendicular to a surface of the optical information recording medium, in a direction parallel to the surface of the optical information recording medium, and in such a direction as to change an inclination of the pick-up body with respect to the surface of the optical information recording medium.

In the optical pick-up device of the invention, the pick-up body may comprise: information light generation means for generating information light carrying information; recording-specific reference light generation means for generating recording-specific reference light; and a recording optical system for irradiating the optical information recording medium with the information light and the recording-specific reference light from the same side so that information is recorded on the optical information recording medium in the form of an interference pattern resulting from interference between the information light and the recording-specific reference light. In this case, the recording optical system may perform the irradiation with the information light and the recording-specific reference light so that an optical axis of the information light and an optical axis of the recording-specific reference light are located on the same line.

In the optical pick-up device of the invention, the pick-up body may comprise: reproduction-specific reference light generation means for generating reproduction-specific reference light; a reproducing optical system for irradiating the optical information recording medium with the reproduction-specific reference light and collecting reproduction light generated from the optical information recording medium on the same side as that from which the optical information recording medium is irradiated with the reproduction-specific reference light; and detection means for detecting the reproduction light collected by the reproducing optical system. In this case, the reproducing optical system may perform the irradiation with the reproduction-specific reference light and the collection of the reproduction light so that an optical axis of the reproduction-specific reference light and an optical axis of the reproduction light are located on the same line.

In the optical pick-up device of the invention, the pick-up body may comprise: information light generation means for generating information light carrying information; recording-specific reference light generation means for generating recording-specific reference light; reproduction-specific reference light generation means for generating reproduction-specific reference light; a recording/reproducing optical system for irradiating the optical information recording medium with the information light and the recording-specific reference light from the same side so that information is recorded on the optical information recording medium in the form of an interference pattern resulting from interference between the information light and the recording-specific reference light, and for irradiating the optical information recording medium with the reproduction-specific reference light and collecting reproduction light generated from the optical information recording medium on the same side as that from which the optical information recording medium is irradiated with the reproduction-specific reference light; and detection means for detecting the reproduction light collected by the recording/reproducing optical system. In this case, the recording/reproducing optical system may perform the irradiation with the information light, the recording-specific reference light and the reproduction-specific reference light and the collection of the reproduction light so that an optical axis of the information light, an optical axis of the recording-specific reference light, an optical axis of the reproduction-specific reference light, and an optical axis of the reproduction light are located on the same line. In addition, the information light generation means may modulate light spatially, and the detection means may detect a spatial modulation pattern of light.

The other objects, features, and advantages of the invention will become fully apparent from the following description.

BEST MODE FOR CARRYING OUT THE INVENTION

Embodiments of the invention will now be described in detail with reference to the drawings.

Figure 1:
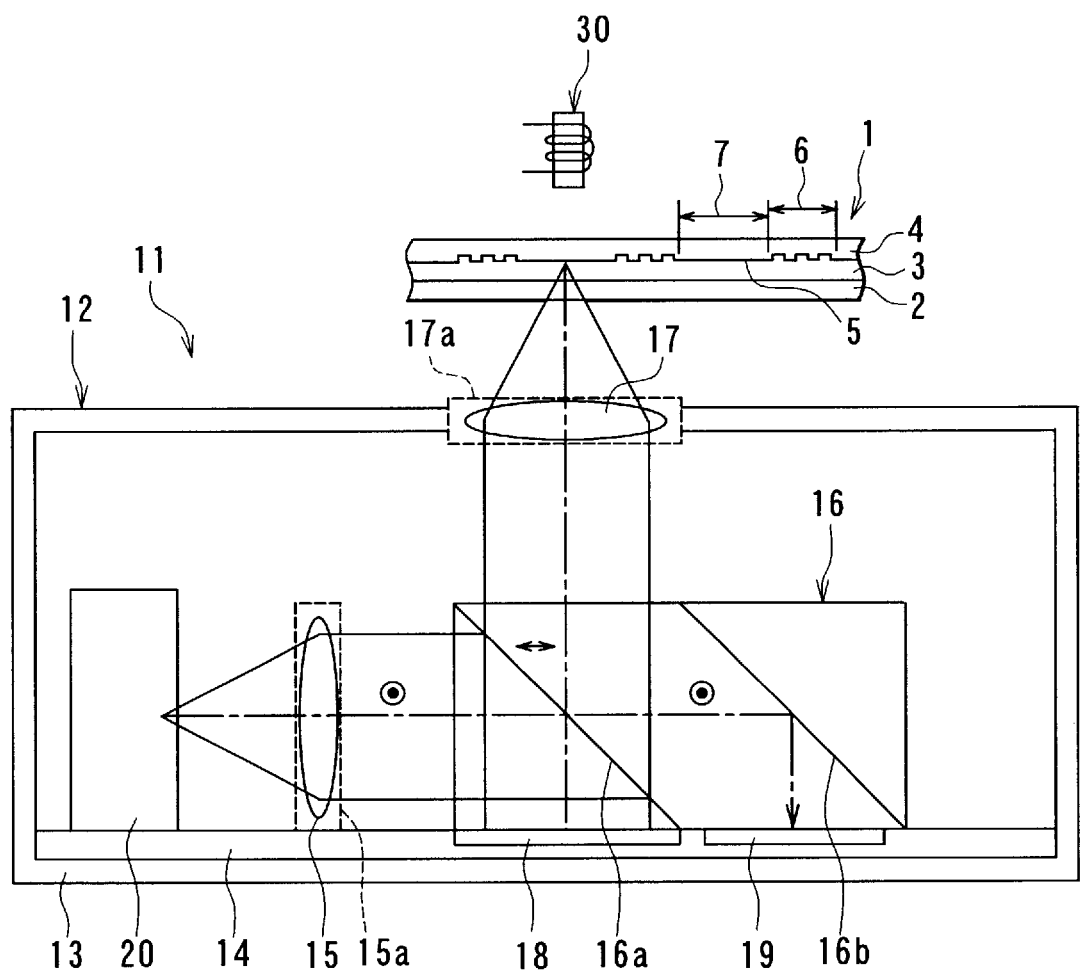
FIG. 1 is an explanatory diagram showing a schematic configuration of an optical pick-up device according to an embodiment of the invention.
Figure 2:
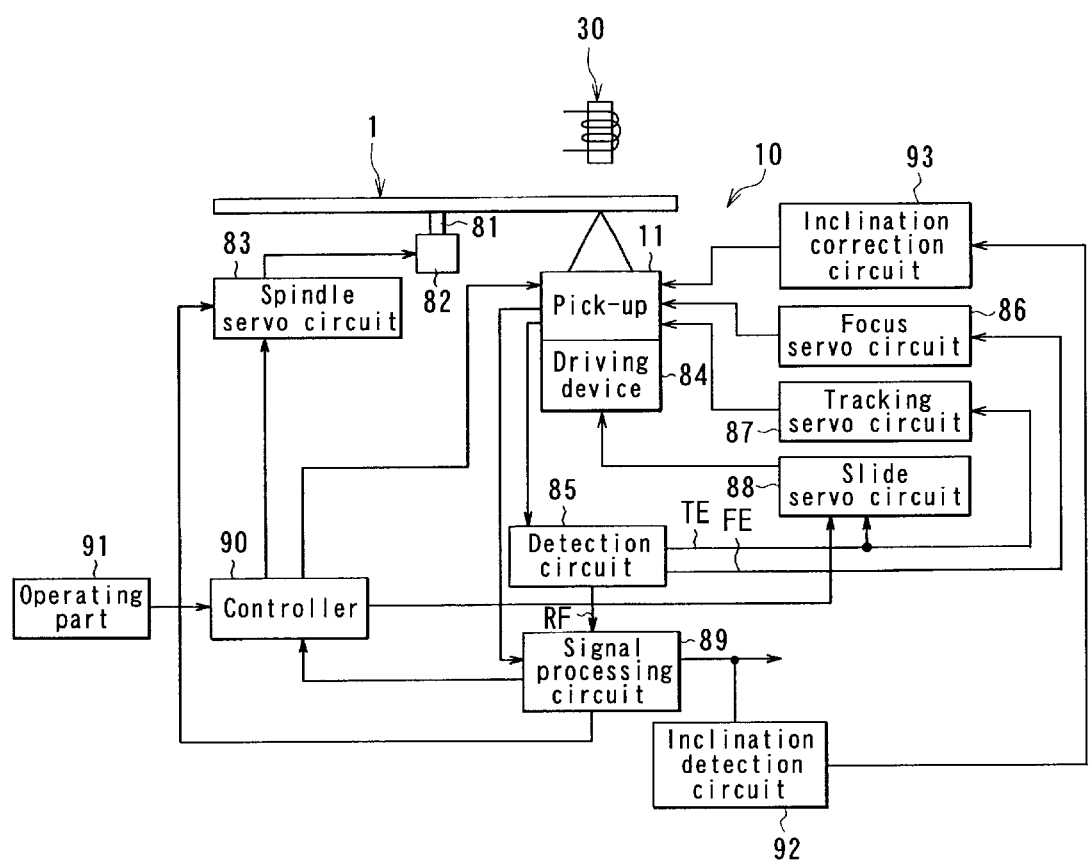
FIG. 2 is a block diagram showing a general configuration of an optical information recording/reproducing apparatus including the optical pick-up device according to the embodiment of the invention.

FIG. 1 is an explanatory diagram showing a schematic configuration of an optical pick-up device according to an embodiment of the invention. FIG. 2 is a block diagram showing a general configuration of an optical information recording/reproducing apparatus including the optical pick-up device according to the embodiment.

Reference is now made to FIG. 1 to describe a configuration of an optical information recording medium in the present embodiment. The optical information recording medium 1 is made up of an information recording layer 3 on which information is recorded through the use of volume holography, a reflection film 5, and a protection layer 4 that are stacked in this order on one surface of a disk-like transparent substrate 2 made of polycarbonate or the like. A plurality of address servo areas 6 serving as positioning areas extending linearly in radial directions are provided at predetermined angular intervals on the interface between the information recording layer 3 and the protection layer 4. Sections in the form of sectors between adjacent ones of the address servo areas 6 are provided as data areas 7. On the address servo areas 6, information for performing focus servo and tracking servo under a sampled servo system and address information are recorded in advance in the form of emboss pits or the like. The focus servo can be performed by using a reflecting surface of the reflection film 5. For example, wobble pits may be used as the information for performing tracking servo. The transparent substrate 2 has an appropriate thickness of 0.6 mm or less, for example. The information recording layer 3 has an appropriate thickness of 10 $\mu$m or more, for example. The information recording layer 3 is made of a magneto-optic recording material, on which information is recorded in the form of distribution patterns of magnetization through the use of holography. The information recording layer 3 may be made of a typical magneto-optic recording material such as a TbFeCo-based amorphous film. Besides, a granular film, a magnetic film having pinning sites, and magnetic photonic crystal may also be used. The reflection film 5 is made of aluminum, for example.

Reference is now made to FIG. 2 to describe the configuration of the optical information recording/reproducing apparatus. The optical information recording/reproducing apparatus 10 comprises: a spindle 81 on which the optical information recording medium 1 is mounted; a spindle motor 82 for rotating the spindle 81; and a spindle servo circuit 83 for controlling the spindle motor 82 so that the rotating speed of the optical information recording medium 1 is kept at a predetermined value. The optical information recording/reproducing apparatus 10 further comprises: an optical pick-up device 11 for irradiating the optical information recording medium 1 with information light and recording-specific reference light to record information, and irradiating the optical information recording medium 1 with reproduction-specific reference light and detecting reproduction light to reproduce information recorded on the optical information recording medium 1; an electromagnetic coil 30 located to oppose to the optical pick-up device 11 with the optical information recording medium 1 in between; and a driving device 84 for allowing the optical pick-up device 11 and the electromagnetic coil 30 to be integrally movable in a direction of the radius of the optical information recording medium 1.

The optical information recording/reproducing apparatus 10 further comprises: a detection circuit 85 for detecting a focus error signal FE, a tracking error signal TE, and a reproduction signal RF from an output signal of the optical pick-up device 11; a focus servo circuit 86 for performing focus servo by moving a pick-up body to be described later in the optical pick-up device 11 in a direction of the thickness of the optical information recording medium 1 based on the focus error signal FE detected by the detection circuit 85; a tracking servo circuit 87 for performing tracking servo by moving the pick-up body in a direction of the radius of the optical information recording medium 1 based on the tracking error signal TE detected by the detection circuit 85; and a slide servo circuit 88 for performing slide servo by controlling the driving device 84 based on the tracking error signal TE and a command from a controller to be described later to move the optical pick-up device 11 in a direction of the radius of the optical information recording medium 1.

The optical information recording/reproducing apparatus 10 further comprises: a signal processing circuit 89 for decoding the output data of a CCD array of the optical pick-up device 11 to be described later to reproduce data recorded in the data areas 7 of the optical information recording medium 1, and for reproducing a basic clock and determining addresses from the reproduction signal RF from the detection circuit 85; a controller 90 for controlling the optical information recording/reproducing apparatus 10 as a whole; and an operating part 91 for giving various instructions to the controller 90.

The optical information recording/reproducing apparatus 10 further comprises: an inclination detection circuit 92 for detecting a relative inclination between the optical information recording medium 1 and the pick-up body; and an inclination correction circuit 93 for correcting the relative inclination between the optical information recording medium 1 and the pick-up body by changing the position of the pick-up body based on an output signal of the inclination detection circuit 92 in such a direction as to change the inclination of the pick-up body with respect to the surface of the optical information recording medium 1.

The controller 90 receives input of the basic clock and address information outputted from the signal processing circuit 89, and controls the optical pick-up device 11, the spindle servo circuit 83, the slide servo circuit 88, and so on. The spindle servo circuit 83 receives input of the basic clock outputted from the signal processing circuit 89. The controller 90 has a CPU (Central Processing Unit), a ROM (Read Only Memory), and a RAM (Random Access Memory). Using the RAM as a work area, the CPU executes programs stored in the ROM to implement the functions of the controller 90.

Next, with reference to FIG. 1, description will be given of the configuration of the optical pick-up device 11 according to the present embodiment. The optical pick-up device 11 has the pick-up body 12 for recording information on the optical information recording medium 1 and reproducing information from the optical information recording medium 1.

The pick-up body 12 has a housing 13. A semiconductor substrate 14 is fixed to the bottom inside the housing 13. A laser coupler 20, a collimator lens 15, and a prism block 16 are arranged in this order on the semiconductor substrate 14. The laser coupler 20 and the prism block 16 are directly fixed onto the semiconductor substrate 14. The collimator lens 15 is fixed to the semiconductor substrate 14 via a lens frame 15a. The laser coupler 20 contains a semiconductor laser for emitting laser light, and an optical system and photodetectors for detecting a focus error signal FE, a tracking error signal TE, and a reproduction signal RF out of return light from the optical information recording medium 1. The configuration of the laser coupler 20 will be detailed later.

The prism block 16 has a polarization beam splitter surface 16a and a reflecting surface 16b. Of the polarization beam splitter surface 16a and the reflecting surface 16b, the polarization beam splitter surface 16a is located closer to the collimator lens 15. The polarization beam splitter surface 16a and the reflecting surface 16b are arranged in parallel with each other, and the direction of the normal of each of the surfaces 16a and 16b is inclined by 45° with respect to the direction of the optical axis of the collimator lens 15.

In the semiconductor substrate 14, a spatial light modulator 18 of reflective type is formed beneath the polarization beam splitter surface 16a, and a CCD array 19 is formed beneath the reflecting surface 16b.

The spatial light modulator 18 has a number of pixels arranged in a matrix, and is capable of selecting whether or not to rotate the direction of polarization of outgoing light by 90° with respect to the direction of polarization of incident light pixel by pixel. For example, the spatial light modulator 18 may be a reflective liquid crystal element which utilizes the optical rotary power of the liquid crystal, from which polarizing plates on both the incidence and outgoing sides are removed. The spatial light modulator 18 constitutes the information light generation means, the recording-specific reference light generation means, and the reproduction-specific reference light generation means.

The CCD array 19 has a number of pixels arranged in a matrix. The CCD array 19 corresponds to the detection means of the invention.

Moreover, an opening is formed in the top surface of the housing 13 at a position opposite to the spatial light modulator 18 across the polarization beam splitter surface 16a. This opening is loaded with an objective lens 17. The objective lens 17 is fixed to the housing 13 via a lens frame 17a.

Thus, the elements constituting the optical system of the optical pick-up device 11 are all fixed to the housing 13 directly or indirectly.

Next, description will be given of the functions of the optical system in the pick-up body 12. The laser coupler 20 emits coherent S-polarized light. Incidentally, S-polarization refers to linear polarization the direction of which is perpendicular to the incidence plane (plane of FIG. 1). P-polarization to be described later refers to linear polarization the direction of which is parallel with the incidence plane.

The S-polarized laser light emitted from the laser coupler 20 is collimated by the collimator lens 15, incident on the polarization beam splitter surface 16a of the prism block 16, reflected by the polarization beam splitter surface 16a and then incident on the spatial light modulator 18. The emergent light from the spatial light modulator 18 becomes P-polarized or S-polarized pixel by pixel. The emergent light from the spatial light modulator 18 is incident on the polarization beam splitter surface 16a of the prism block 16 again. Of this light, S-polarized light is reflected by the polarization beam splitter surface 16a, and P-polarized light alone is transmitted through the polarization beam splitter surface 16a and incident on the objective lens 17. The light incident on the objective lens 17 is condensed and projected onto the optical information recording medium 1 so that it converges on the interface between the information recording layer 3 and the protection layer 4 of the optical information recording medium 1. This light is reflected by the reflection film 5 of the optical information recording medium 1 and returns to the objective lens 17.

The return light from the optical information recording medium 1 is collimated by the objective lens 17 and incident on the polarization beam splitter surface 16a of the prism block 16. P-polarized components of this return light are transmitted through the polarization beam splitter surface 16a and incident on the spatial light modulator 18. The emergent light from the spatial light modulator 18 becomes P-polarized or S-polarized pixel by pixel. The emergent light from the spatial light modulator 18 is incident on the polarization beam splitter surface 16a of the prism block 16 again. Of this light, S-polarized light is reflected by the polarization beam splitter surface 16a and incident on the laser coupler 20. Meanwhile, S-polarized components of the return light from the optical information recording medium 1 are reflected by the polarization beam splitter surface 16a, and are further reflected by the reflecting surface 16b to be incident on the CCD array 19.

Figure 3:
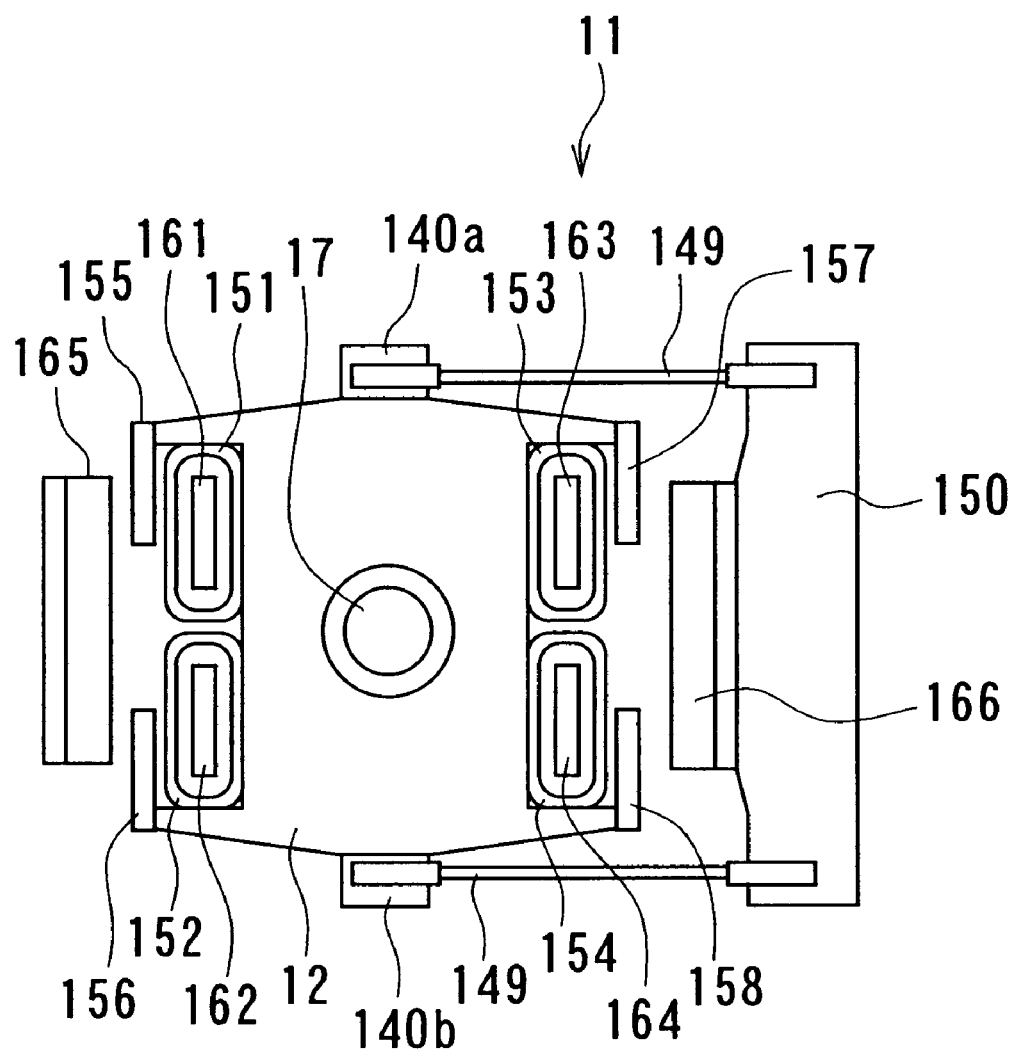
FIG. 3 is a plan view of a position adjusting device of the embodiment of the invention.

Reference is now made to FIG. 3 to describe a position adjusting device that adjusts the position of the pick-up body 12 in the optical pick-up device 11 in order to correct a shift in the relative positional relationship between the pick-up body 12 and the optical information recording medium 1. FIG. 3 is a plan view of the position adjusting device.

In FIG. 3, the horizontal direction is the track direction. The position adjusting device has the following configuration. Elastic arm fixing portions 140a and 140b are provided on both ends of the pick-up body 12 in a direction orthogonal to the track direction. Elastic arms 149 formed of an elastic member such as rubber, a plate spring, a coil spring and a wire are fixed to the elastic arm fixing portions 140a and 140b at one of ends of each elastic arm 149. The other ends of the elastic arms 149 are fixed to a fixing wall 150 of the optical information recording/reproducing apparatus.

Coils 151 and 152 for focus servo and inclination adjustment, and coils 155 and 156 for tracking servo are attached to one end of the pick-up body 12 in the track direction. Similarly, coils 153 and 154 for focus servo and inclination adjustment, and coils 157 and 158 for tracking servo are attached to the other end of the pick-up body 12 in the track direction.

The position adjusting device has magnets 161, 162, 163, and 164 arranged to penetrate through the coils 151, 152, 153, and 154, respectively, a magnet 165 located to face the coils 155 and 156, and a magnet 166 located to face the coils 157 and 158.

This position adjusting device is capable of changing the position of the pick-up body 12 in a direction perpendicular to the surface of the optical information recording medium 1 (direction perpendicular to the plane of FIG. 3), in a direction parallel to the surface of the optical information recording medium 1 (vertical direction in FIG. 3), and in such a direction as to change the inclination of the pick-up body 12 with respect to the surface of the optical information recording medium 1.

The coils 151 to 154 of the position adjusting device are driven by the focus servo circuit 86 and the inclination correction circuit 93 shown in FIG. 2. On the other hand, the coils 155 to 158 are driven by the tracking servo circuit 87 shown in FIG. 2.

Figure 4:
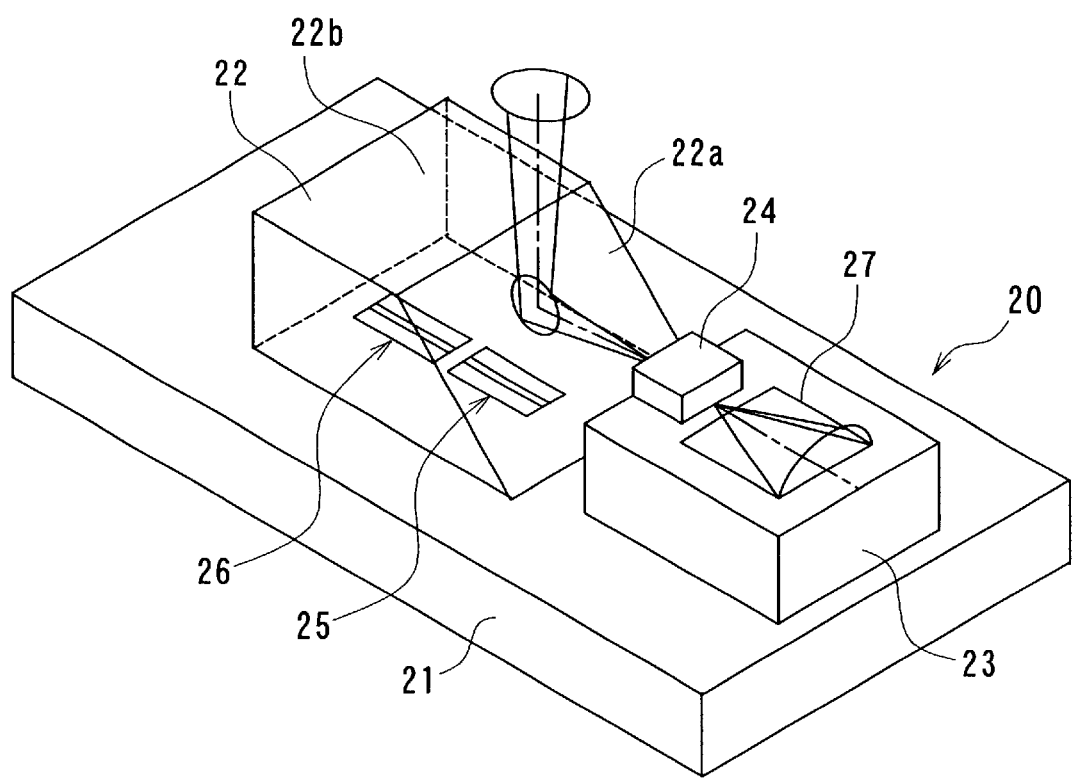
FIG. 4 is a perspective view showing a configuration of a laser coupler of the embodiment of the invention.
Figure 5:
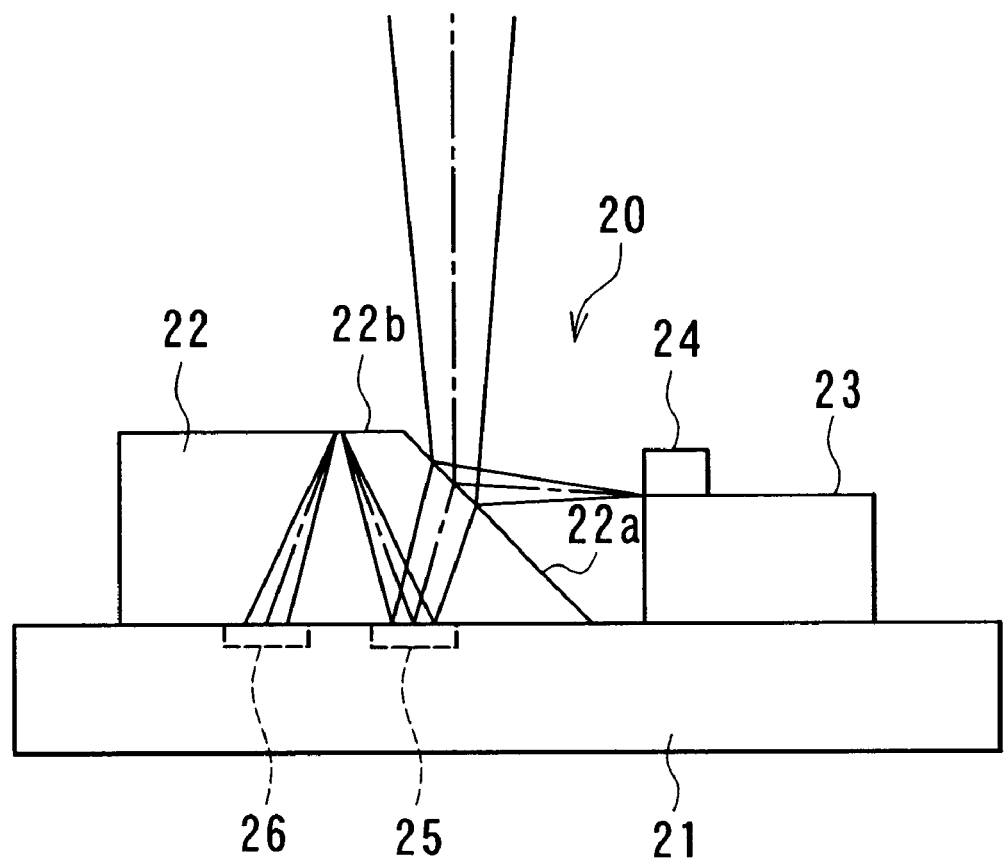
FIG. 5 is a side view of the laser coupler of the embodiment of the invention.

Next, the laser coupler 20 will be described with reference to FIG. 4 through FIG. 6. FIG. 4 is a perspective view showing a configuration of the laser coupler 20. FIG. 5 is a side view of the laser coupler 20. As shown in these diagrams, the laser coupler 20 comprises: a semiconductor substrate 21 in which photodetectors 25 and 26 are formed; a prism 22 located on this semiconductor substrate 21 so as to cover the photodetectors 25 and 26, being joined onto the semiconductor substrate 21; a semiconductor device 23 located on the semiconductor substrate 21 in a region other than a region where the photodetectors 25 and 26 are formed, being joined onto the semiconductor substrate 21; and a semiconductor laser 24 joined onto the semiconductor device 23. The semiconductor laser 24 horizontally emits forward laser light toward the prism 22 and emits backward laser light in the direction opposite to the forward laser light. The prism 22 has an oblique surface facing toward the semiconductor laser 24. This oblique surface serves as a semi-reflecting surface 22a that reflects part of the forward laser light from the semiconductor laser 24 to emit it in the direction perpendicular to the semiconductor substrate 21, and transmits part of the return light from the optical information recording medium 1. In addition, the top surface of the prism 22 serves as a total-reflecting surface 22b that totally reflects the light passing through the prism 22 as shown in FIG. 5. The semiconductor device 23 is provided with a photodetector 27 for receiving the backward laser light from the semiconductor laser 24. An output signal of the photodetector 27 is used for automatic adjustment of the output of the semiconductor laser 24. The semiconductor substrate 21 contains various amplifiers and other electronic parts. The semiconductor device 23 contains electronic parts such as an amplifier for driving the semiconductor laser 24.

In the laser coupler 20 shown in FIGS. 4 and 5, part of the forward laser light from the semiconductor laser 24 is reflected by the semi-reflecting surface 22a of the prism 22 and incident on the collimator lens 15 shown in FIG. 1. On the other hand, part of the return light from the optical information recording medium 1, condensed by the collimator lens 15, is transmitted through the semi-reflecting surface 22a of the prism 22 and introduced into the prism 22 toward the photodetector 25. A semi-reflecting film is formed on the photodetector 25. Part of the light introduced into the prism 22 is transmitted through the semi-reflecting film on the photodetector 25 and incident on the photodetector 25. The rest of the light is reflected by the semi-reflecting film on the photodetector 25, and is further reflected by the total-reflecting surface 22b of the prism 22 to be incident on the photodetector 26.

Here, as shown in FIG. 5, the light introduced into the optical prism 22 once converges halfway through the optical path between the photodetectors 25 and 26. Then, the diameters of the incident light on the photodetectors 25 and 26 coincide with each other when the light from the laser coupler 20 converges on the interface between the hologram layer 3 and the protection layer 4 of the optical information recording medium 1, or in other words, when the light is in focus. When out of focus, the diameters of the incident light on the photodetectors 25 and 26 differ from each other. Since the diameters of the incident light on the photodetectors 25 and 26 change in directions opposite to each other, the focus error signal is obtainable by detecting signals corresponding to the changes of the diameters of the incident light on the photodetectors 25 and 26. As shown in FIG. 4, each of the photodetectors 25 and 26 has three-way split light receiving portions. The light receiving portions of the photodetector 25 shall be A1, C1, and B1, and the light receiving portions of the photodetector 26 A2, C2, and B2. C1 and C2 are light receiving portions located at the centers between A1 and B1 and between A2 and B2, respectively. The split lines between the individual light receiving portions are arranged in parallel to the direction corresponding to the track direction of the optical information recording medium 1. Consequently, from differences in output between the light receiving portions A1 and B1 and between A2 and B2, the tracking error signal is obtainable by a push-pull method.

Figure 6:
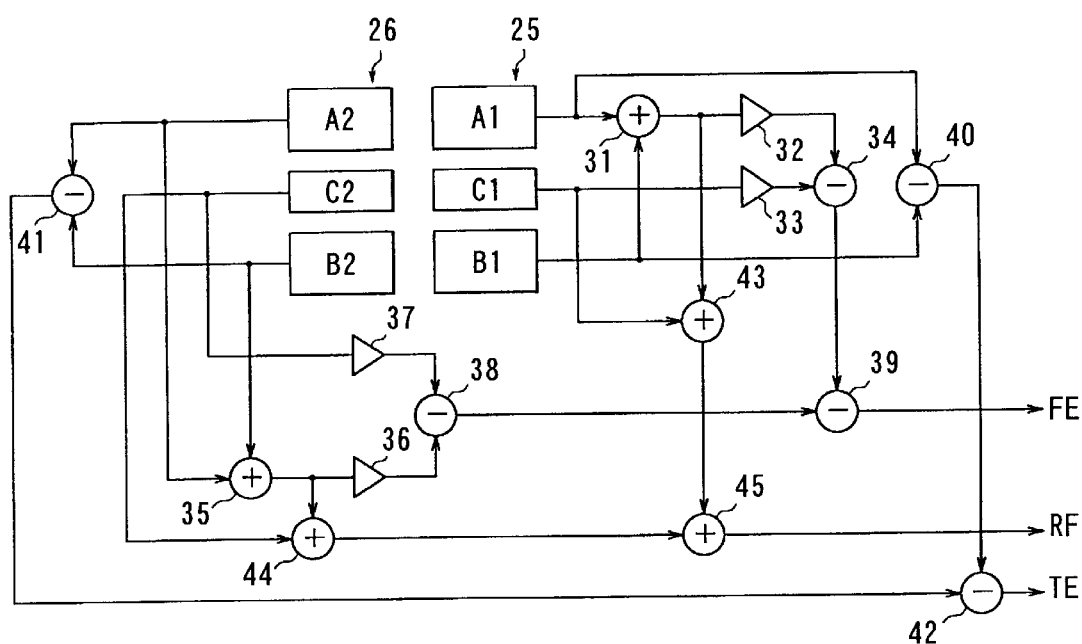
FIG. 6 is a block diagram showing a configuration of a detection circuit of the embodiment of the invention.

FIG. 6 is a block diagram showing a configuration of the detection circuit 85 for detecting the focus error signal, the tracking error signal, and the reproduction signal based on the outputs of the photodetectors 25 and 26. The detection circuit 85 comprises: an adder 31 for adding the outputs of the light receiving portions A1 and B1 of the photodetector 25; a gain adjusting amplifier 32 for adjusting the gain in the output of the adder 31; a gain adjusting amplifier 33 for adjusting the gain in the output of the light receiving portion C1 of the photodetector 25; a subtracter 34 for calculating a difference between the output of the gain adjusting amplifier 32 and the output of the gain adjusting amplifier 33; an adder 35 for adding the outputs of the light receiving portions A2 and B2 of the photodetector 26; a gain adjusting amplifier 36 for adjusting the gain in the output of the adder 35; a gain adjusting amplifier 37 for adjusting the gain in the output of the light receiving portion C2 of the photodetector 26; a subtracter 38 for calculating a difference between the output of the gain adjusting amplifier 36 and the output of the gain adjusting amplifier 37; and a subtracter 39 for calculating a difference between the output of the subtracter 34 and the output of the subtracter 38 to generate the focus error signal FE.

The detection circuit 85 further comprises: a subtracter 40 for calculating a difference between the output of the light receiving portion A1 and the output of the light receiving portion B1 of the photodetector 25; a subtracter 41 for calculating a difference between the output of the light receiving portion A2 and the output of the light receiving portion B2 of the photodetector 26; and a subtracter 42 for calculating a difference between the output of the subtracter 40 and the output of the subtracter 41 to generate the tracking error signal TE. The detection circuit 85 further comprises: an adder 43 for adding the output of the adder 31 and the output of the light receiving portion C1; an adder 44 for adding the output of the adder 35 and the output of the light receiving portion C2; and an adder 45 for adding the output of the adder 43 and the output of the adder 44 to generate the reproduction signal RF. In the present embodiment, the reproduction signal RF is a signal which is the reproduction of the information recorded in the address servo areas 6 of the optical information recording medium 1.

Reference is now made to FIGS. 7A through 7C and FIG. 8 to describe the principle of magnetic holography utilized in the present embodiment. Magnetic holography is information recording technology that combines the characteristics of magneto-optic recording and holography. More specifically, in magnetic holography, information is recorded by forming distribution patterns of magnetization corresponding to holography-based interference patterns in an information recording layer made of a magneto-optic recording material.

Figure 7A:
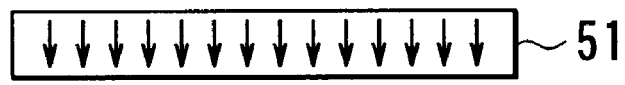
FIGS. 7A through 7C are explanatory diagrams illustrating the principle of magneto-optic recording to be used in magnetic holography.
Figure 7B:
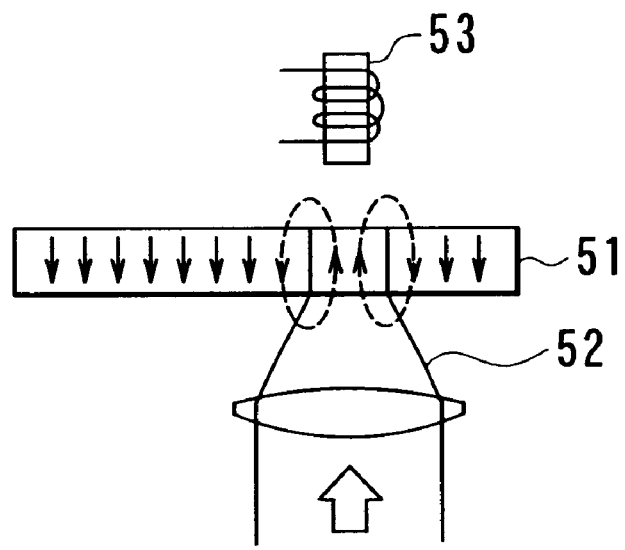
Figure 7C:

First, the principle of magneto-optic recording used in magnetic holography will be described with reference to FIGS. 7A through 7C. FIG. 7A shows an information recording layer 51 made of a magneto-optic recording material. The arrows in the information recording layer 51 indicate directions of magnetization. In FIG. 7A, the directions of magnetization in the information recording layer 51 are all downward. To record information on the information recording layer 51, the information recording layer 51 is irradiated with laser light 52 at a desired portion as shown in FIG. 7B, and an external magnetic field in the direction opposite to the directions of magnetization shown in FIG. 7A is applied by an electromagnetic coil 53. In the information recording layer 51, the portion irradiated with the laser light 52 reaches or exceeds Curie point in temperature, and the magnetization disappears. As shown in FIG. 7C, when the irradiation with the laser light 52 is ended, the temperature in the portion having been irradiated with the laser light 52 falls to or below Curie point, and magnetization is fixed in the same direction as that of the external magnetic field. In this way, in magneto-optic recording, the information recording layer 51 is selectively irradiated with light to form a distribution pattern of magnetization to thereby record information. The information recorded on the information recording layer 51 is reproduced through the use of a magneto-optic effect, i.e., Kerr effect or Faraday effect.

In magnetic holography, instead of selectively irradiating the information recording layer 51 with the laser light 52, a holography-based interference pattern is formed in the information recording layer 51. In this case, the information recording layer 51 rises in temperature at portions of the interference pattern where the light intensity is higher. Consequently, a distribution pattern of magnetization corresponding to the interference pattern is formed in the information recording layer 51.

Figure 8:
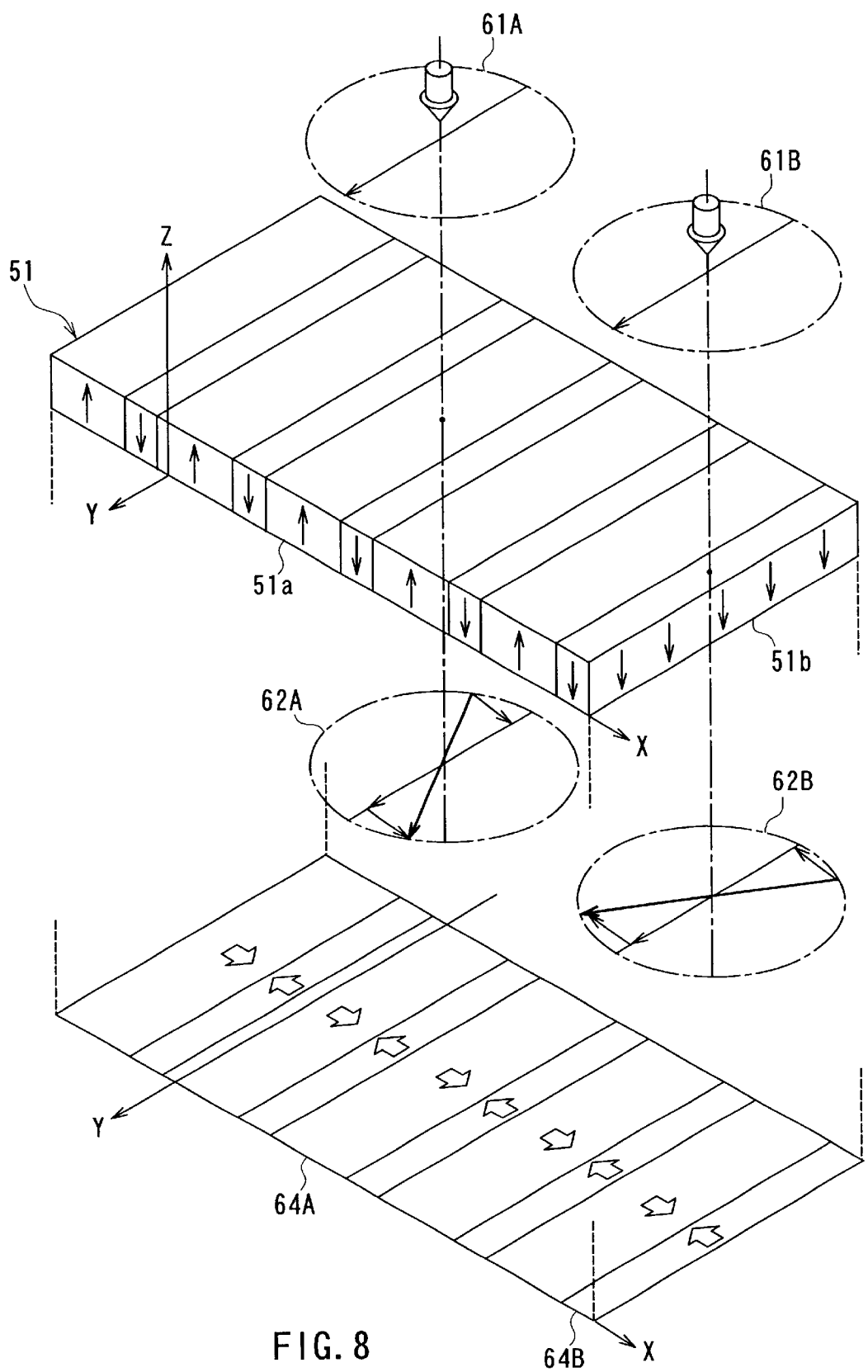
FIG. 8 is an explanatory diagram illustrating the principle of reproduction of information in magnetic holography.

Next, the principle of reproduction of information in magnetic holography will be described with reference to FIG. 8. In FIG. 8, the information recording layer 51 has a distribution pattern of magnetization in which two types of band-shaped portions 51a and 51b that are opposite in direction of magnetization are arranged alternately. In FIG. 8, the direction in which the band-shaped portions 51a and 51b are arranged is defined as X direction; the direction along the lengths of the band-shaped portions 51a and 51b is defined as Y direction; and the direction orthogonal to the X and Y directions is defined as Z direction.

It is here assumed that light linearly polarized in the Y direction is incident on the information recording layer 51. In FIG. 8, the reference numerals 61A and 61B represent beams of the light incident on the band-shaped portions 51a and 51b, respectively. The arrows inside the ellipses drawn with alternate long and short dashed lines represent the directions of polarization. The directions of polarization of the beams of light 62A and 62B having passed through the band-shaped portions 51a and 51b are rotated by a predetermined angle in directions opposite to each other due to Faraday effect. Consequently, the beams of light 62A and 62B bear Y-directional polarized components of the same magnitude and X-directional polarized components in opposite directions. In FIG. 8, the reference numeral 64A indicates part of the beams of light just having passed through the information recording layer 51, the part having a positive X-directional polarized component. The reference numeral 64B indicates another part of the beams of light just having passed through the information recording layer 51, the part having a negative X-directional polarized component.

Of the light having passed through the information recording layer 51, zeroth order diffracted light exhibits the Y-directional polarized component alone. On the other hand, first order diffracted light of the light having passed through the information recording layer 51 exhibits the X-directional polarized component alone. Therefore, of the light having passed through the information recording layer 51, that consisting of the X-directional polarized components is the light diffracted by the distribution pattern of magnetization, i.e., holography-based interference pattern, of the information recording layer 51. This light serves as reproduction light that carries the information recorded on the information recording layer 51. Thus, in the magnetic holography, information can be reproduced by detecting light having polarized components in the direction orthogonal to the direction of polarization of the light incident on the information recording layer 51.

In FIG. 8, the distribution pattern of magnetization of the information recording layer 51 is a two-dimensional one. In the present embodiment, however, three-dimensional distribution patterns of magnetization are formed in the information recording layer 3 of the optical information recording medium 1 shown in FIG. 1. It is thereby possible to enhance the diffraction efficiency of the distribution patterns of magnetization and to attain increased recording capacity through multiplex recording.

Figure 9A:
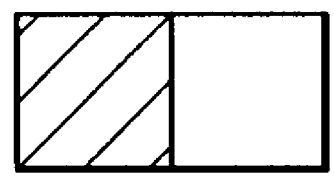
FIGS. 9A and 9B are explanatory diagrams showing how information is expressed in the embodiment of the invention.
Figure 9B:
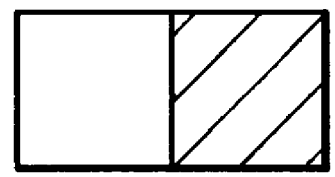

Reference is now made to FIGS. 9A and 9B to describe how information is expressed in the present embodiment. In the embodiment, intensity (amplitude) of light is spatially modulated to generate information light that carries information. In the embodiment, adjoining two pixels express single-bit digital data of "1" or "0". More specifically, as shown in FIG. 9A, one of the two pixels is darkened and the other is brightened to express digital data "1", and, as shown in FIG. 9B, the dark and bright are inverted to express digital data "0". Two pixels both brightened or both darkened means error data.

Next, with reference to FIG. 1, description will be given of the functions of the optical information recording/reproducing apparatus 10 according to the embodiment under servo, recording, and reproducing operations, individually. Here, directions of magnetization in the information recording layer 3 of the optical information recording medium 1 shall be all identical initially.

First, the function under servo operation will be described. Under servo operation, the spatial light modulator 18 rotates, for every pixel, the direction of polarization of the emergent light by 90° with respect to the direction of polarization of the incident light. The power of light emitted from the laser coupler 20 is set to a low level for reproduction. The controller 90 predicts the timing at which the light that has exited from the objective lens 17 passes through the address servo areas 6 based on the basic clock reproduced from the reproduction signal RF, and maintains the foregoing setting while the light from the objective lens 17 passes through the address servo areas 6.

The S-polarized light emitted from the laser coupler 20 is collimated by the collimator lens 15, incident on the polarization beam splitter surface 16a of the prism block 16, reflected by the polarization beam splitter surface 16a, and incident on the spatial light modulator 18. The emergent light from the spatial light modulator 18 is P-polarized for every pixel. The emergent light from the spatial light modulator 18 is incident on the polarization beam splitter surface 16a of the prism block 16 again, transmitted through the same, and incident on the objective lens 17. The light incident on the objective lens 17 is condensed and projected onto the optical information recording medium 1 so that it converges on the interface between the information recording layer 3 and the protection layer 4 of the optical information recording medium 1. This light is reflected by the reflection film 5 of the optical information recording medium 1. At this time, the light is modulated by the emboss pits in the address servo areas 6 and then returns to the objective lens 17.

The return light from the optical information recording medium 1 is collimated by the objective lens 17 and incident on the polarization beam splitter surface 16a of the prism block 16. P-polarized components of this return light are transmitted through the polarization beam splitter surface 16a, and then incident on the spatial light modulator 18. The emergent light from the spatial light modulator 18 here is S-polarized light, which is reflected by the polarization beam splitter surface 16a and incident on the laser coupler 20. The light incident on the laser coupler 20 is detected by the photodetectors 25 and 26 in the laser coupler 20. Then, based on the outputs of these photodetectors 25 and 26, the focus error signal FE, the tracking error signal TE, and the reproduction signal RF are generated. Based on these signals, focus servo and tracking servo are performed, along with the generation of the basic clock and the determination of addresses.

In the foregoing setting under the servo operation, the configuration of the optical pick-up device 11 is similar to that of pick-ups intended for recording and reproduction with ordinary optical disks such as a CD (compact disk), a DVD (digital video disk or digital versatile disk), and an HS (hyper storage disk). It is therefore possible to configure the optical information recording/reproducing apparatus 10 of the present embodiment to have compatibility with ordinary optical disk devices.

Next, description will be given of the function under recording operation. Under recording operation, the spatial light modulator 18 selects, pixel by pixel, whether or not to rotate the direction of polarization of the emergent light by 90° with respect to the direction of polarization of the incident light. In addition, the electromagnetic coil 30 applies to the information recording layer 3 of the optical information recording medium 1 an external magnetic field in the direction opposite to the initial direction of magnetization of the information recording layer 3.

The power of light emitted from the laser coupler 20 is set to reach high levels on a pulse basis for recording. The controller 90 predicts the timing at which the light that has exited from the objective lens 17 passes through the data areas 7 based on the basic clock reproduced from the reproduction signal RF, and maintains the foregoing setting while the light from the objective lens 17 passes through the data areas 7. While the light from the objective lens 17 passes through the data areas 7, neither focus servo nor tracking servo is performed and the pick-up body 12 is fixed.

The S-polarized light emitted from the laser coupler 20 is collimated by the collimator lens 15, incident on the polarization beam splitter surface 16a of the prism block 16, reflected by the polarization beam splitter surface 16a and incident on the spatial light modulator 18. The emergent light from the spatial light modulator 18 is P-polarized or S-polarized pixel by pixel. The emergent light from the spatial light modulator 18 is incident on the polarization beam splitter surface 16a of the prism block 16 again. Of this light, P-polarized light alone is transmitted through the polarization beam splitter surface 16a and incident on the objective lens 17. The light incident on the objective lens 17 is condensed and projected onto the optical information recording medium 1 so that it converges on the interface between the information recording layer 3 and the protection layer 4 of the optical information recording medium 1. This light is reflected by the reflection film 5 of the optical information recording medium 1 and returns to the objective lens 17.

Under the recording operation, the light projected onto the information recording medium 1 is light which is spatially modulated in intensity. In the embodiment, this modulated light has functions of both the information light and the recording-specific reference light. That is, when projected onto the information recording medium 1, this modulated light passes through the information recording layer 3, is reflected by the reflection film 5, and then passes through the information recording layer 3 again. Here, the light that initially passes through the information recording layer 3 and the light that passes through the information recording layer 3 after being reflected by the reflection film 5 interfere with each other to form a three-dimensional interference pattern. Consequently, one of these two kinds of light serves as the information light and the other as the recording-specific reference light.

In the information recording layer 3, the information light and the recording-specific reference light interfere with each other to form a three-dimensional interference pattern. Then, when the power of the light emitted from the laser coupler 20 reaches a high level, the information recording layer 3 rises in temperature at portions where the light intensity is higher. Subsequent to that, when the temperature at the portions drops following a shift of the irradiation target portion, the directions of magnetization are inverted. As a result, a three-dimensional distribution pattern of magnetization corresponding to the interference pattern between the information light and the recording-specific reference light is formed in the information recording layer 3.

Next, description will be given of the function under reproducing operation. Under reproducing operation, the spatial light modulator 18 rotates, for every pixel, the direction of polarization of the emergent light by 90° with respect to the direction of polarization of the incident light. Otherwise, in order to make the spatial frequency of the reproduction-specific reference light generally equal to the spatial frequency of the recording-specific reference light, the direction of polarization of the emergent light may be switched alternately for each pixel of the spatial light modulator light 18 to generate reproduction-specific reference light that is spatially modulated in a checkered pattern.

The power of the light emitted from the laser coupler 20 is set to a low level for reproduction. The controller 90 predicts the timing at which the light that has exited from the objective lens 17 passes through the data areas 7 based on the basic clock reproduced from the reproduction signal RF, and maintains the foregoing setting while the light from the objective lens 17 passes through the data areas 7. While the light from the objective lens 17 passes through the data areas 7, neither focus servo nor tracking servo is performed and the pick-up body 12 is fixed.

The S-polarized light emitted from the laser coupler 20 is collimated by the collimator lens 15, incident on the polarization beam splitter surface 16a of the prism block 16, reflected by the polarization beam splitter surface 16a, and incident on the spatial light modulator 18. P-polarized light out of the emergent light from the spatial light modulator 18 is transmitted through the polarization beam splitter surface 16a of the prism block 16 to become reproduction-specific reference light, which is incident on the objective lens 17. This reproduction-specific reference light is condensed and projected onto the optical information recording medium 1 so that it converges on the interface between the information recording layer 3 and the protection layer 4 of the optical information recording medium 1. This light is reflected by the reflection film 5 of the optical information recording medium 1 and passes through the information recording layer 3 again.

Here, the reproduction-specific reference light that first passes through the information recording layer 3 causes reproduction light that proceeds toward the objective lens 17 from the information recording layer 3. On the other hand, the reproduction-specific reference light that passes through the information recording layer 3 after being reflected by the reflection film 5 causes reproduction light that proceeds toward the reflection film 5 from the information recording layer 3. This reproduction light is reflected by the reflection film 5 and proceeds toward the objective lens 17.

The reproduction light is S-polarized. This reproduction light is collimated by the objective lens 17, reflected by the polarization beam splitter surface 16a of the prism block 16, and is further reflected by the reflecting surface 16b to be incident on the CCD array 19. On the CCD array 19 is formed a spatial modulation pattern of the information light under the recording operation. This modulation pattern is detected to reproduce the information.

As shown in FIG. 1, in the present embodiment, the irradiation with the information light, the recording-specific reference light and the reproduction-specific reference light, and the collection of the reproduction light are performed on the same side of the information recording layer 3 so that the optical axis of the information light, the optical axis of the recording-specific reference light, the optical axis of the reproduction-specific reference light, and the optical axis of the reproduction light are located on the same line.

Next, with reference to FIG. 3, description will be given of the function of the position adjusting device in the optical pick-up device 11 according to the present embodiment. The coils 151 to 154 of the position adjusting device are driven by the focus servo circuit 86 and the inclination correction circuit 93 shown in FIG. 2. On the other hand, the coils 155 to 158 are driven by the tracking servo circuit 87 shown in FIG. 2.

The focus servo circuit 86 drives the coils 151 to 154 based on the focus error signal FE so that the positions of the coils 151 to 154 change by the same amount in a direction perpendicular to the surface of the optical information recording medium 1 (direction perpendicular to the plane of FIG. 3). The position of the pick-up body 12 is thereby changed in the direction perpendicular to the surface of the optical information recording medium 1, and focus servo is performed.

The tracking servo circuit 87 drives the coils 155 to 158 based on the tracking error signal TE so that the coils 155 to 158 are displaced in the same direction. The position of the pick-up body 12 is thereby changed in a direction orthogonal to the track of the optical information recording medium 1, and tracking servo is performed.

The inclination correction circuit 93 drives the coils 151 to 154 based on the results of detection of the inclination detection circuit 92 so that at least one of the coils 151 to 154 differs from the rest of the coils in amount of displacement. The inclination of the pick-up body 12 with respect to the surface of the optical information recording medium 1 is thereby changed to correct the relative inclination between the optical information recording medium 1 and the pick-up body 12.

Relative inclinations between the optical information recording medium 1 and the pick-up body 12 include ones resulting from a tilt or curve of the optical information recording medium 1 along the radial direction (hereinafter referred to as radial tilt), and ones resulting from a tilt or curve of the optical information recording medium 1 along the circumferential direction (hereinafter referred to as tangential tilt). Since the position adjusting device according to the present embodiment is capable of inclining the pick-up body 12 in arbitrary directions, it is possible to correct any relative inclination between the optical information recording medium 1 and the pick-up body 12, including those resulting from the radial tilt and tangential tilt.

Here, description will be given of two examples of the method of detecting the relative inclination between the optical information recording medium 1 and the pick-up body 12 with the inclination detection circuit 92. In a first example, information for inclination detection is recorded on a plurality of predetermined locations in the optical information recording medium 1 by using information light modulated in a checkered pattern and the recording-specific reference light. Then, to detect inclination, the information for inclination detection is reproduced. When there is no relative inclination between the optical information recording medium 1 and the pick-up body 12, differences in output between vertically- or horizontally-adjoining two pixels of the CCD array 19 become maximum. On the other hand, when a relative inclination occurs between the optical information recording medium 1 and the pick-up body 12, the differences in output between vertically- or horizontally-adjoining two pixels of the CCD array 19 decrease. In the first example, the direction and magnitude of the relative inclination between the optical information recording medium 1 and the pick-up body 12 are detected from a decrease in the difference in output between vertically-adjoining two pixels and a decrease in the difference in output between horizontally-adjoining two pixels.

In a second example of the method for detecting an inclination, a predetermined pit pattern is formed on the optical information recording medium 1 in advance. This pattern is irradiated with light, and the diffracted light resulting from the pattern is received by a photodetector having a plurality of split light receiving portions. Then, the direction of displacement and the amount of displacement of the diffracted light are detected from the outputs of this photodetector with reference to a state where there is no relative inclination between the optical information recording medium 1 and the pick-up body 12. The direction and magnitude of the relative inclination between the optical information recording medium 1 and the pick-up body 12 are thereby detected.

As has been described, the optical pick-up device 11 of the present embodiment comprises: the pick-up body 12 for at least either recording information on the optical information recording medium 1 on which information is recorded through the use of holography, or reproducing information from the optical information recording medium 1; and the position adjusting device for adjusting the position of the pick-up body 12 in order to correct a shift in the relative positional relationship between the pick-up body 12 and the optical information recording medium 1. The elements constituting the optical system of the optical pick-up device 11 are all fixed to the housing 13 directly or indirectly.

Consequently, according to the optical pick-up device 11 of the embodiment, vibrations externally applied to the optical pick-up device 11 will not cause any of the elements constituting the optical system of the optical pick-up device 11 to vibrate relative to the rest. It is therefore possible to prevent recording and reproduction accuracy from deteriorating due to vibrations from exterior. Specifically, according to the embodiment, recording accuracy is improved because the interference pattern formed in the information recording layer 3 of the optical information recording medium 1 is stabilized under recording operation. Under reproducing operation, reproduction accuracy is improved because changes in the positional relationship between the reproduction-specific reference light and the interference pattern are suppressed.

Besides, according to the embodiment, a shift in the relative positional relationship between the pick-up body 12 and the optical information recording medium 1 is correctable with the position adjusting device. It is therefore possible to prevent recording and reproduction accuracy from deteriorating due to fluctuations in the relative positional relationship between the pick-up body 12 and the optical information recording medium 1.

In addition, according to the embodiment, even if the optical information recording medium 1 expands/contracts to shrink or enlarge the modulation pattern of the reproduction light, it is possible to maintain the modulation pattern of the reproduction light almost constant in magnitude by adjusting the distance between the pick-up body 12 and the optical information recording medium 1.

Moreover, according to the embodiment, the spatial light modulator 18 and the CCD array 19 are formed on the same semiconductor substrate 14. This makes it possible to ensure precise correspondence between the positions of the pixels of the spatial light modulator 18 and the positions of the pixels of the CCD array 19, and to avoid a change in the correspondence.

Furthermore, according to the embodiment, the irradiation of the optical information recording medium 1 with the recording-specific reference light and the information light for recording, and the irradiation of the optical information recording medium 1 with the reproduction-specific reference light and the collection of the reproduction light for reproduction are all performed from the same side and on the same axis on the optical information recording medium 1. This allows a compact configuration of the optical system for recording and reproduction. In addition, according to the embodiment, it is possible to configure the optical system for recording and reproduction in the form of the optical pick-up device 11 as with ordinary optical disk devices. This facilitates random access to the optical information recording medium 1.

Additionally, according to the embodiment, information for performing focus servo and tracking servo is recorded on the optical information recording medium 1 so that this information can be used to perform focus servo and tracking servo. This allows a precise positioning of the light for recording or reproduction, which consequently improves removability, facilitates random access, and increases recording density, recording capacity and transfer rate.

Besides, according to the embodiment, information recorded in the form of emboss pits on a recording medium can be reproduced by bringing the optical pick-up device 11 into a servo state. It is thereby possible to attain compatibility with conventional optical disk devices.

Moreover, according to the optical information recording/reproducing apparatus 10 of the embodiment, a three-dimensional distribution pattern of magnetization corresponding to a three-dimensional interference pattern resulting from interference between the information light and the recording-specific reference light is formed in the information recording layer 3 of the optical information recording medium 1 to thereby record information. It is thus possible to record information on the optical information recording medium 1 in the form of a three-dimensional interference pattern through the use of holography. In addition, the distribution pattern of magnetization formed in the information recording layer 3 is easily changeable. Hence, according to the embodiment, it is possible to record information on the information recording layer 3 so that the information is erasable in part.

Furthermore, according to the optical information recording/reproducing apparatus 10 of the embodiment, reproduction light that carries the information recorded is obtained by irradiating the distribution pattern of magnetization formed in the information recording layer 3 with the reproduction-specific reference light, and the information can be reproduced by detecting the reproduction light. In addition, according to the embodiment, the direction of polarization of the reproduction light is orthogonal to the direction of polarization of the reproduction-specific reference light. It is therefore easy to separate the reproduction light and the reproduction-specific reference light from each other by using the polarization beam splitter surface 16a, and the SN ratio (signal-to-noise ratio) of the reproduction signal is thereby improved.

The present invention is not limited to the foregoing embodiment, and various modifications may be made thereto. For example, the device for detecting information recorded on the information recording layer 3 may be a smart light sensor in which MOS type solid image pick-up devices and a signal processing circuit are integrated on a single chip (for example, see the literature "O plus E, September 1996, No. 202, pp. 93–99"), instead of the CCD array. Since this smart light sensor has a high transfer rate and high-speed operation facilities, the use of this smart light sensor allows high-speed reproduction. For example, reproduction can be performed at transfer rates on the order of Gbit/s.

Besides, when a smart light sensor is used as the device for detecting the information recorded on the information recording layer 3 in particular, address information and the like need not be recorded on the address servo areas 6 of the optical information recording medium 1 in the form of emboss pits. Instead, a predetermined pattern of address information or the like may be recorded in advance by the same method as with the holography-based recording on the data areas 7 so that the address information or the like be detected by the smart light sensor with the pick-up under servo operation rendered in the same state as under reproducing operation. In this case, the basic clock and addresses can be obtained directly from the detection data of the smart light sensor. The tracking error signal can be obtained from the position information of the reproduction pattern on the smart light sensor. In addition, focus servo can be performed by driving the objective lens so that the reproduction pattern on the smart light sensor becomes maximum in contrast. Besides, under reproducing operation, focus servo can also be performed by driving the objective lens so that the reproduction pattern on the smart light sensor becomes maximum in contrast.

Moreover, the position adjusting device may be rendered capable of changing the position of the pick-up body 12 even in the track direction, too.

Furthermore, in the foregoing embodiment, under the recording operation, a half area of the spatial light modulator 18 may be used to generate the information light while the other half area may be used to generate the recording-specific reference light.

As has been described, the optical pick-up device of the present invention comprises the pick-up body for at least either recording information on an optical information recording medium on which information is recorded through the use of holography, or reproducing information from the optical information recording medium, and position adjusting means for adjusting the position of the pick-up body in order to correct a shift in the relative positional relationship between the pick-up body and the optical information recording medium. It is therefore possible to prevent recording and reproduction accuracy from deteriorating due to vibrations from exterior and fluctuations in the relative positional relationship between the optical pick-up device and the recording medium.

It is apparent from the foregoing description that the invention may be carried out in various modes and may be modified in various ways. It is therefore to be understood that within the scope of equivalence of the appended claims the invention may be practiced in modes other than the foregoing best modes.

What is claimed is:

1. An optical pick-up device comprising:
   a pick-up body for at least either recording information on an optical information recording medium on which information is recorded through the use of holography, or reproducing information from the optical information recording medium; and
   position adjusting means for adjusting a position of the pick-up body in order to correct a shift in a relative positional relationship between the pick-up body and the optical information recording medium,
   wherein the position adjusting means detects relative inclination between the optical information recording medium and the pick-up body, and, based on the results of the detection, changes the position of the pick-up body in such a direction as to change an inclination of the pick-up body with respect to the surface of the optical information recording medium.

2. An optical pick-up device according to claim 1, wherein the position adjusting means changes the position of the pick-up body further in a direction perpendicular to a surface of the optical information recording medium and in a direction parallel to the surface of the optical information recording medium.

3. An optical pick-up device according to claim 1, wherein the pick-up body comprises:
   information light generation means for generating information light carrying information;
   recording-specific reference light generation means for generating recording-specific reference light; and a recording optical system for irradiating the optical information recording medium with the information light and the recording-specific reference light from the same side so that information is recorded on the optical information recording medium in the form of an interference pattern resulting from interference between the information light and the recording-specific reference light.

4. An optical pick-up device according to claim 3, wherein the recording optical system performs the irradiation with the information light and the recording-specific reference light so that an optical axis of the information light and an optical axis of the recording-specific reference light are located on the same line.

5. An optical pick-up device according to claim 1, wherein the pick-up body comprises:

reproduction-specific reference light generation means for generating reproduction-specific reference light;

a reproducing optical system for irradiating the optical information recording medium with the reproduction-specific reference light and collecting reproduction light generated from the optical information recording medium on the same side as that from which the optical information recording medium is irradiated with the reproduction-specific reference light; and detection means for detecting the reproduction light collected by the reproducing optical system.

6. An optical pick-up device according to claim 5, wherein the reproducing optical system performs the irradiation with the reproduction-specific reference light and the collection of the reproduction light so that an optical axis of the reproduction-specific reference light and an optical axis of the reproduction light are located on the same line.

7. An optical pick-up device according to claim 1, wherein the pick-up body comprises:

information light generation means for generating information light carrying information;

recording-specific reference light generation means for generating recording-specific reference light;

reproduction-specific reference light generation means for generating reproduction-specific reference light;

a recording/reproducing optical system for irradiating the optical information recording medium with the information light and the recording-specific reference light from the same side so that information is recorded on the optical information recording medium in the form of an interference pattern resulting from interference between the information light and the recording-specific reference light, and for irradiating the optical information recording medium with the reproduction-specific reference light and collecting reproduction light generated from the optical information recording medium on the same side as that from which the optical information recording medium is irradiated with the reproduction-specific reference light; and detection means for detecting the reproduction light collected by the recording/reproducing optical system.

8. An optical pick-up device according to claim 7, wherein the recording/reproducing optical system performs the irradiation with the information light, the recording-specific reference light and the reproduction-specific reference light and the collection of the reproduction light so that an optical axis of the information light, an optical axis of the recording-specific reference light, an optical axis of the reproduction-specific reference light, and an optical axis of the reproduction light are located on the same line.

9. An optical pick-up device according to claim 7, wherein the information light generation means modulates light spatially, and the detection means detects a spatial modulation pattern of light.

* * * * *